United States Patent Office 3,256,267
Patented June 14, 1966

3,256,267
NONAPEPTIDES AND METHOD OF MANUFACTURE
Roger Boissonnas, Bottmingen, Basel Land, Switzerland, assignor to Sandoz Ltd. (also known as Sandoz A.G.), Basel, Switzerland, a Swiss firm
No Drawing. Filed May 29, 1961, Ser. No. 113,129
Claims priority, application Switzerland, June 2, 1960, 6,334/60
8 Claims. (Cl. 260—112.5)

The present invention relates to a hitherto unsynthesized polypeptide and to a process for its manufacture.

The nonapeptide having the Formula I,

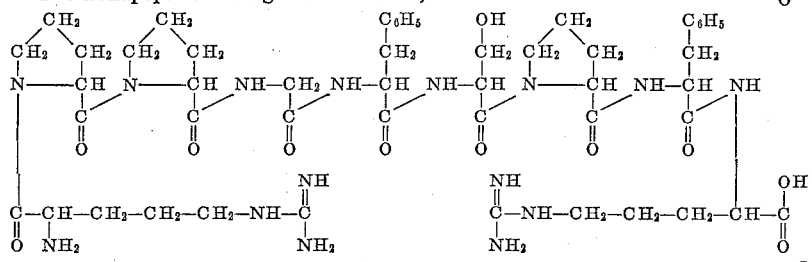

has been synthesized now for the first time. It has been found that the nonapeptide I is identical with the naturally occurring bradykinin of which the structural formula has hitherto been unknown. Bradykinin was first discovered by Rocha e Silva, M., Beraldo, W. T., and Rosenfeld, G., Amer. J. Physiol., 156, 261 (1949), twelve years before the synthesis of the nonapeptide I. Since the discovery of bradykinin, various attempts were made to elucidate its structure but without success; until immediately before its present synthesis by the inventor of the present invention, bradykinin was thought to be an octapeptide [see Elliott, D. F., Horton, E. W., and Lewis, G. P., J. Physiol., 150, 6 P (1960)]. It is stressed that the nonapeptide I was synthesized by the present inventor before the structure of bradykinin was known and that the identity of bradykinin with the nonapeptide I was established after the last mentioned compound's synthesis [see Nature, vol. 188, No. 4755, p. 998, December 17, 1960].

Thus, the present invention provides the nonapeptide of the Formula I above, and nonapeptides having the general Formula IV,

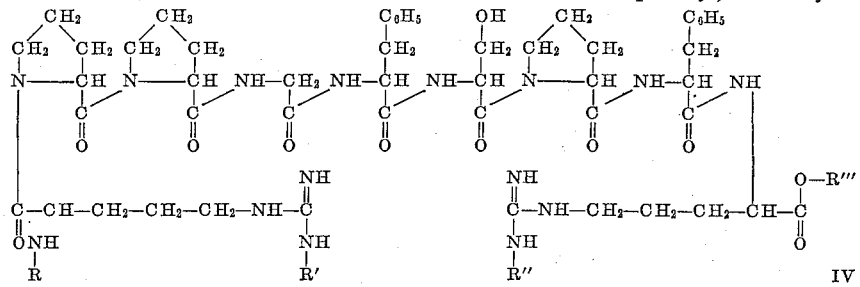

in which
R represents a hydrogen atom or a protective grouping for an amino group,
R' and R" each represent a hydrogen atom or a protective grouping for a guanido grouping, and
R''' represents a hydrogen atom or a protective grouping for a carboxylic acid grouping with the proviso that at least one of R, R', R" and R''' must be a protective grouping.

The present invention also includes pharmaceutical compositions containing, in addition to an inert carrier, the nonapeptide I above.

The present invention also provides a process for the production of the nonapeptide I, characterized in that the protective grouping or groupings present in a compound IV is or are split off.

The compounds IV above may be obtained by condensing a tetrapeptide of the general Formula II,

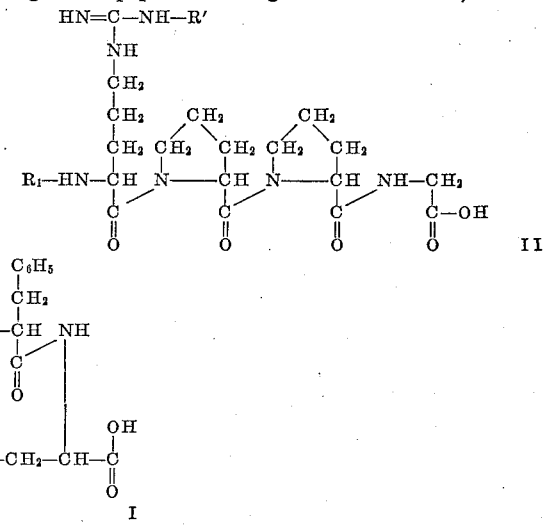

in which
$R_1$ represents a protective grouping for an amino grouping, and
R' has the above significance,
either in the form of the free acid or a reactive derivative thereof, with a pentapeptide of the formula III.

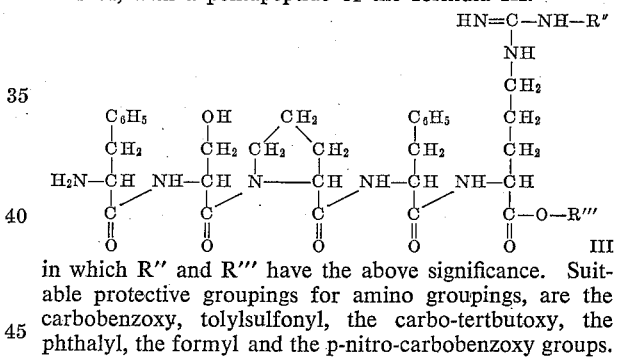

in which R" and R''' have the above significance. Suitable protective groupings for amino groupings, are the carbobenzoxy, tolylsulfonyl, the carbo-tertbutoxy, the phthalyl, the formyl and the p-nitro-carbobenzoxy groups.

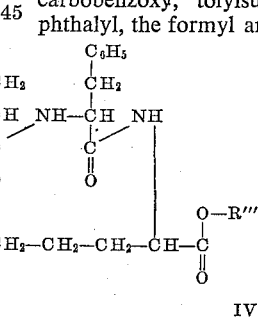

Suitable protective groupings for the guanido groupings are the carbobenzoxy, tolylsulfonyl and the nitro groups. Suitable protective groupings for the carboxyl groupings are the benzyl, the p-nitrobenzyl, the methyl-, the ethyl-, and the tert-butyl groups.

The nonapeptide I strongly lowers the blood pressure and has a high vascular activity which may be made use of in treatment of peripheral circulation troubles and hypertony.

One method of producing compound I above may be effected as follows: N-carbobenzoxy-nitro-L-arginine is condensed with the methyl ester of L-proline and the resulting dipeptide ester is saponified to give the corresponding acid. The last mentioned material is condensed with the tertiary butyl ester of L-prolyl-glycine and the resulting tetrapeptide ester is saponified by treatment with hydrogen chloride to give the free acid of the Formula II above. Furthermore, the p-nitrobenzyl ester of nitro-L-arginine is condensed with N-carbobenzoxy-L-phenylalanine, the carbobenzoxy group is selectively split off with hydrogen bromide in glacial acetic acid, the resulting dipeptide is condensed with N-carbobenzoxy-L-proline, the carbobenzoxy group is split off in similar manner and the resulting tripeptide is condensed with N-carbobenzoxy-L-phenylalanine-L-seryl azide. The last mentioned material is obtained by condensation of N-carbobenzoxy-L-phenylalanine with the methyl ester of L-serine and conversion of the resulting dipeptide ester into the azide via the hydrazide. The resulting pentapeptide has the carbobenzoxy group split off with hydrogen bromide in trifluoro acetic acid giving the pentapeptide III which is condensed with the tetrapeptide II to give the corresponding nonapeptide having the general Formula IV above, from which the nonapeptide I is obtained by hydrogenolysis of the protective groupings.

In the immediately preceding specific method of producing the compound I it is possible to split off the protective groupings R″ and R‴ of the pentapeptide before the condensation with the tetrapeptide. It is likewise possible to use for the condensation a tetrapeptide in which R′ represents a hydrogen atom.

Various other condensation procedures using peptides containing the required number of amino acid groups, or even a peptide with an amino acid, may be substituted for the above described specific method of producing the nonapeptide I as is well known in the field of polypeptide chemistry, and such variations are also within the scope of invention.

In the process of the invention the splitting off of the protective groupings may be effected, inter alia, by hydrogenolysis, for example with an alkali metal in liquid ammonia, or by catalytic hydrogenation.

The following examples illustrate the invention without, however, limiting it. Temperatures are expressed in degree centigrade.

EXAMPLE 1

(a) *N-carbobenzoxy-nitro-L-arginyl-L-proline*

35.5 g. of N-carbobenzoxy-nitro-L-arginine, 12.9 g. of L-proline methyl ester and 24.8 g. of dicyclohexylcarbodiimide are dissolved at −10° in 250 cc. of dimethyl formamide and 100 cc. of acetonitrile, the solution being allowed to stand overnight at 20° and then boiled down in a vacuum. The residue is triturated in petroleum ether, dissolved in ethyl acetate, and the filtrate is washed with dilute hydrochloric acid and dilute ammonia. The ethyl acetate is evaporated in a vacuum, the residue dissolved in 300 cc. of methanol and 300 cc. of a 1 N-solution of caustic soda, and the solution kept for 1 hour. 500 cc. of water are then added, followed by filtration, acidification with dilute hydrochloric acid and extraction with ethyl acetate. After evaporation of the ethyl acetate the residue crystallises when methanol is added. 23.0 g. of N-carbobenzoxy-nitro-L-arginyl-L-proline are obtained, M.P. 119°; $[\alpha]_D^{21} = -47°$ (c.=2 in glacial acetic acid).

(b) *N-carbobenzoxy-nitro-L-arginyl-L-prolyl glycine*

9.6 cc. of chloroformic ethyl ester are added at −10° to a solution of 24.9 g. of N-carbobenzoxy-L-proline and 14.0 cc. of triethylamine in 300 cc. of chloroform, 11.3 g. of glycine-tert.-butyl ester being added thereto after 10 minutes. The mixture is left for two hours at room temperature, washed with dilute ammonia and dilute phosphoric acid, evaporated in a vacuum, dissolved in methanol, and the carbobenzoxy group is then split off by catalytic hydrogenation. The solution is boiled down, the residue dissolved in 250 cc. of dimethyl formamide and 100 cc. of acetonitrile, and 40.0 g. of N-carbobenzoxy-nitro-L-arginyl-L-proline together with 22.0 g. of dicyclohexylcarbodiimide are then added. The mixture is allowed to stand overnight at 20° and evaporated in a a vacuum. The residue is triturated in petroleum ether, dissolved in chloroform, washed with dilute phosphoric acid and dilute ammonia and dried on sodium sulphate. Dry hydrogen chloride is then passed through the solution for 4 hours at 35°. After boiling down in a vacuum and adding ethyl ether, 30.2 g. of N-carbobenzoxy-nitro-L-arginyl-L-prolyl-L-prolyl glycine are obtained. M.P. 115° under decomposition. Eq. weight 605. Found 602.

(c) *N-carbobenzoxy-L-phenylalanyl-L-seryl-azide*

30.0 g. of N-carbobenzoxy-L-phenylalanine, 15 g. of L-serine-methyl ester hydrochloride, 14 cc. of triethylamine and 24.8 g. of dicyclohexylcarbodiimide are dissolved in 1500 cc. of acetonitrile at −10°. The solution is allowed to stand overnight at 20°, filtered, boiled down in a vacuum, and the residue is triturated in petroleum ether, re-dissolved in ethyl acetate, washed with dilute hydrochloric acid and dilute ammonia, dried on sodium sulphate and precipitated with petroleum ether. The precipitate is dissolved in 300 cc. of methanol, and 12 cc. of hydrazine hydrate are added. The solution is allowed to stand overnight at 20°, then filtered and washed with menthanol and ether. 28.2 g. of hydrazide of M.P. 193° are obtained, which are dissolved in 100 cc. of glacial acetic acid and 100 cc. of a 2 N-hydrochloric acid. After the solution has been cooled to −5°, 15 cc. of a 5 N-solution of sodium nitrite and, 10 minutes later, 450 cc. of ice cold water are added. The precipitate is filtered off, washed with water and rapidly dried in a vacuum. 26.1 g. of the azide are obtained and immediately used.

(d) *L-phenylalanyl-L-seryl-L-prolyl-L-phenylalanyl-nitro-L-arginine-p-nitro-benzyl ester*

106 g. of N-carbobenzoxy-nitro-L-arginine, 63 cc. of triethylamine and 77 g. of p-nitro-benzylchloride are dissolved in 450 cc. of dimethyl formamide and kept at 80° overnight. The solution is then boiled down in a vacuum, the residue dissolved in ethyl acetate, washed with dilute hydrochloric acid and dilute ammonia, dried on sodium sulphate and again boiled down in a vacuum. The crystallised residue is dissolved in 1100 cc. of a 2.2 N-solution of hydrogen bromide in glacial acetic acid and left for exactly 20 minutes at 20°. The solution is evaporated in a vacuum, ethyl ether is added, and the crystallised residue is dissolved in 300 cc. of dimethyl formamide and 35 cc. of triethylamine. This solution is poured into a freshly prepared mixture obtained by adding 14.5 cc. of chloroformic ethyl ester at −10° to a solution of 45 g. of N-carbobenzoxy-L-phenyl alanine and 21 cc. of triethylamine in 750 cc. of tetrahydrofuran. The mixture is allowed to stand overnight at 20°, and then evaporated in a vacuum. The residue is dissolved in 500 cc. of ethyl acetate, washed with dilute hydrochloric acid and dilute ammonia and dried on sodium sulphate. After the solution has been allowed to stand for several hours at −5°, 56 g. of N-carbobenzoxy-L-phenylalanyl-nitro-L-arginine-p-nitro-benzyl ester (M.P. 174°) are filtered off and dissolved in 550 cc. of a 2.2 N-solution of hydrogen bromide in glacial acetic acid. The solution is left for 20 minutes at 20° and then boiled down in a vacuum, 3000 cc. of ethyl ether being added and the crystallised residue (M.P. 175°) dissolved in 150 cc. of chloroform and 19 cc. of triethylamine. The solution is poured into a freshly prepared mixture obtained by adding 9.0 cc. of chloroformic ethyl ester at −10° to a solution of 23 g. of N-carbobenzoxy-L-proline and 13 cc. of triethylamine in 150 cc. of chloroform. After having allowed this mixture to stand at 20° for three hours it is evaporated in a vacuum, the residue is dissolved in ethyl acetate, washed with dilute hydrochloric acid and dilute ammonia, dried on sodium sulphate, again boiled down in a vacuum, and ethyl ester is added to the residue. 49 g. of the tripeptide ester (M.P. 115°) are obtained and dissolved in 450 cc. of a 2.2 N-solution of hydrogen bromide in glacial acetic acid. After having been left at 20° for 20 minutes the solution is again boiled down in a vacuum. Ethyl ether is added to the residue which is dissolved in a mixture of 450 cc. of ethyl acetate, 225 cc. of acetonitrile and 150 cc. of an aqueous saturated solution of potassium carbonate. The organic phase is separated off, dried on sodium sulphate and evaporated in a vacuum. The residue is dissolved in 300 cc. of dimethyl formamide and 26.1 g. of N-carbobenzoxy-L-phenylalanyl-L-seryl-azide are added. This is allowed to stand at 0° for two days before it is evaporated in a vacuum, ethyl ether being added to the residue and the product recrystallised from isopropanol. The pentapeptide is dissolved in 500 cc. of trifluoroacetic acid, the solution being saturated with hydrogen bromide at 0° and then boiled down in a vacuum after having stood at 0° for one hour. Ethyl ether is added to the residue which is dissolved in a mixture of 300 cc. of dimethyl formamide and 300 cc. of ethyl acetate and shaken out with 50 cc. of an aqueous saturated solution of potassium carbonate. The organic phase is dried on sodium sulphate and evaporated in a vacuum.

The addition of ethyl ether yields 37 g. of L-phenylalanyl - L - seryl - L - prolyl - L - phenylalanyl - nitro - L-arginine-p-nitro-benzyl ester.

(e) *L - arginyl - L - prolyl - L - prolyl - glycyl - L - phenylalanyl - L - seryl - L - prolyl - L - phenylalanyl - L-arginine.*

30 g. of N-carbobenzoxy-nitro-L-arginyl-L-prolyl-L-prolyl-glycine, 37 g. of L-phenylalanyl-L-seryl-L-prolyl-L-phenylalanyl-nitro-L-arginine-p-nitro-benzyl ester and 12 g. of dicyclohexylcarbo-diimide are dissolved at −10° in 300 cc. of dimethylformamide and 100 cc. of acetonitrile, the solution being allowed to stand overnight at 20°, then filtered and evaporated in a vacuum, the residue being suspended in 1000 cc. of boiling ethyl acetate. When this has cooled 55 g. of protected nonapeptide are obtained, which are dissolved in a mixture of 750 cc. of glacial acetic acid, 100 cc. of a 2 N-hydrochloric acid and 650 cc. of water. For 24 hours this is hydrogenated at atmospheric pressure in the presence of a platinum catalyst as described by Van Orden and Smith [J. Biol. Chemistry 208, 751 (1954)]. After filtration and evaporation in a vacuum, the residue is crystallised from isopropanol/water/ethyl ether. 34 g. of the dihydrochloride of L - arginyl - L - prolyl - L - prolyl - glycyl - L-phenylalanyl - L - seryl - L - prolyl - L - phenylalanyl - L-arginine are obtained. The nonapeptide has an isoelectric point of 10.5. When submitted to acid hydrolysis it yields arginine, proline, glycine, phenylalanine and serine in the proportions of 2:3:1:2:1.

EXAMPLE 2

30.2 g. of N-carbobenzoxy-nitro-L-arginyl-L-prolyl-L-prolyl glycine and 7.0 cc. of triethylamine are dissolved in 500 cc. of dioxane at −10° with 4.8 cc. of chloroformic acid ethyl ester, and after 10 minutes 32.6 g. of L - phenylalanyl - L - seryl - L - prolyl - L - phenylalanyl-L-arginine (prepared for instance by hydrogenating N-carbobenzoxy - L - phenylalanyl - L - seryl - L - prolyl - L - phenylalanyl - nitro - L - arginine - p - nitro - benzyl ester) in 200 cc. of water and 7 cc. of triethylamine are added. The solution is stirred for 5 hours at 20° and then evaporated, the residue being washed with water, dilute acetic acid and methyl ethyl ketone and then hydrogenated in a mixture of 750 cc. of glacial acetic acid, 100 cc. of a 2 N-hydrochloric acid and 650 cc. of water for 24 hours at atmospheric pressure in the presence of a platinum catalyst. The further procedure is as described in Example 1, section (e).

EXAMPLE 3

30.9 g. of N-carbobenzoxy-L-arginine, 16.5 g. of L-proline-methylester-chlorohydrate and 24.8 g. of dicyclohexylcarbo-diimide are dissolved at −10° in 250 cc. of dimethyl formamide and 100 cc. of acetonitrile, the solution being allowed to stand overnight at 20° and then boiled down in a vacuum. The residue is triturated in petroleum ether, dissolved in 300 cc. of methanol and 300 cc. of a 1 N-solution of caustic soda and again left for 1 hour at the end of which 500 cc. of water are added, the solution being filtered, neutralised with dilute hydrochloric acid, again filtered, washed with water and dried. 28 g. of N-carbobenzoxy-L-arginine-L-proline are obtained and dissolved in 250 cc. of dimethyl formamide and 100 cc. of acetonitrile. At −10°, 18 g. of dicyclohexylcarbo-diimide, 16.5 g. of L-prolyl-glycine-tert.-butyl ester and 12 g. of toluene-sulphonic acid are added and the mixture is allowed to stand for 16 hours at room temperature before being precipitated with ethyl ether, dissolving the precipitate in 200 cc. of glacial acetic acid, passing dry hydrogen chloride through the solution for 2 hours, evaporating, adding 100 cc. of a 1 N-solution of caustic soda and 100 cc. of methanol, neutralising with hydrochloric acid, filtering and washing with water and isopropanol. 32.5 g. of N-carbobenzoxy-L-arginyl-L-prolyl-L-prolyl-glycine (eq. weight 560; found 557) dissolved in 200 cc. of dimethyl formamide and 50 cc. of acetonitrile in the presence of 9.9 g. of toluene-sulphonic acid, 20 g. of p-nitro-phenol and 20 g. of dicyclohexylcarbo-diimide are added and the mixture is allowed to stand at room temperature overnight. 32.6 g. of L-phenylalanyl - L - seryl - L - prolyl - L - phenylalanyl - L-arginine (prepared, for instance, by hydrogenating N-carbobenzoxy - L - phenylalanyl - L - seryl - L - prolyl - L-phenylnitro-L-arginine-p-nitro-benzyl ester), 100 cc. of water and 7 cc. of triethylamine are added. After having stood at room temperature for 16 hours the solution is boiled down in a vacuum and the residue recrystallised from isopropanol and water. 41 g. of N-carbobenzoxy-L - arginyl - L - prolyl - L - prolyl - glycyl - L - phenylalanyl - L - seryl - L - prolyl - L - phenylalanyl - L - arginine are obtained which are dissolved in 500 cc. of glacial acetic acid and 500 cc. of a 1 N-hydrochloric acid and hydrogenated for one hour at atmospheric pressure in the presence of a platinum catalyst. The further procedure is analogous to that described in Example 1, section (e).

EXAMPLE 4

The procedure is as described in Example 3 but for detaching the carbobenzoxy group, the nonapeptide is dissolved in 4 litres of liquid ammonia and treated with metallic sodium whilst being stirred until the solution turns blue. After evaporating the ammonia the precedure continues as described in Example 1, section (e).

I claim:
1. A process for the production of the nonapeptide I

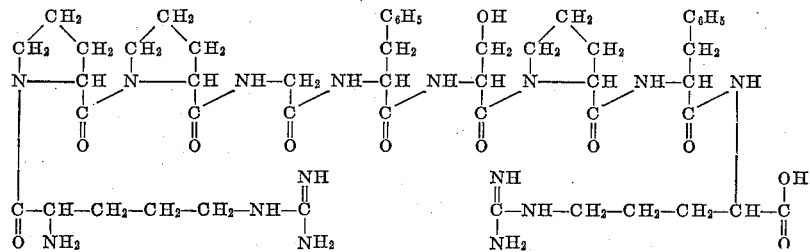

comprising splitting off the protective groupings R, R', R'', R''' present in a compound having the formula IV

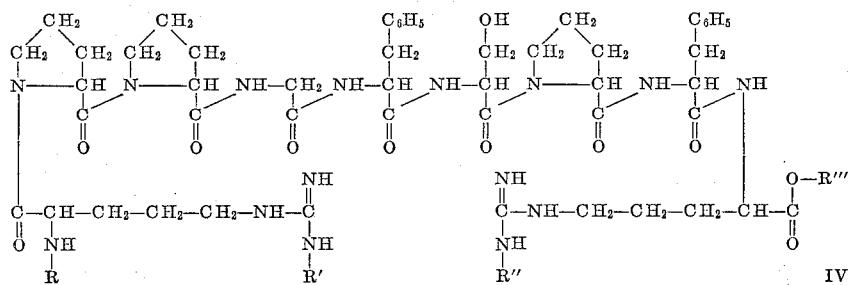

wherein R is selected from the group consisting of hydrogen and a protective grouping for the amino group, said amino protective grouping being a radical selected from the class consisting of the carbobenzoxy-, the toluenesulfonyl-, the carbo-tertiary-butoxy, the phthalyl-, the formyl- and the p-nitro-carbobenzoxy groups, R' and R'' are each selected from the group consisting of hydrogen and a protective grouping for a guanido-grouping selected from the group consisting of the carbobenzoxy-, the toluenesulfonyl- and the nitro groups and R''' is selected from the group consisting of hydrogen and a protective grouping for a carboxylic acid grouping selected from the group consisting of the benzyl-, the p-nitrobenzyl-, the methyl-, the ethyl- and the tertiary-butyl groups, at least one of R, R', R'', and R''' being a protective grouping which is split off by saponification.

2. The compound corresponding to the Formula IV

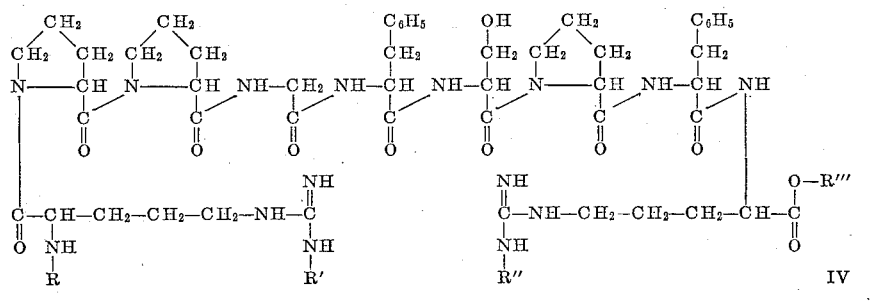

wherein R is selected from the group consisting of hydrogen and a protective grouping for the amino group, said amino protective grouping being a radical selected from the class consisting of the carbobenzoxy-, the toluene - sulfonyl-, the carbo - tertiary - butoxy-, the phthalyl-, the formyl- and the p-nitro-carbobenzoxy groups, R' and R'' are each selected from the group consisting of hydrogen and a protective grouping for a guanido grouping consisting of the carbobenzoxy-, the toluenesulfonyl- and the nitro groups and R''' is selected from the group consisting of hydrogen and a protective grouping for a carboxylic acid grouping consisting of the benzyl-, the p-nitrobenzyl-, the methyl-, the ethyl- and the tertiary-butyl groups, at least one of R, R', R'' and R''' being a protective grouping which is split off by known methods in peptide chemistry.

3. The compound corresponding to the Formula IV

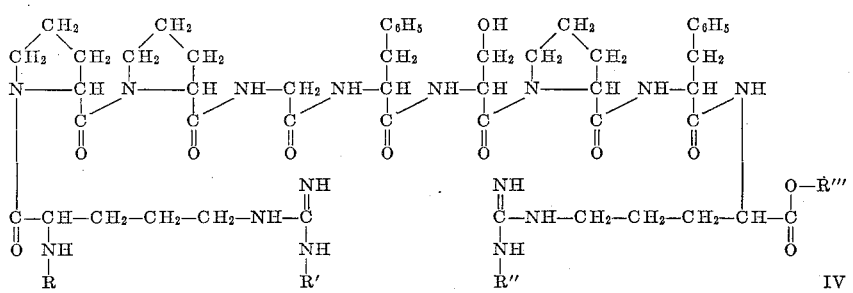

wherein R is selected from the group consisting of carbobenzoxy, toluenesulfonyl, the carbo-tertiary-butoxy, the phthalyl, the formyl and the p-nitro-carbobenzoxy-groups, R' and R'' are each selected from the group consisting of hydrogen, the carbobenzoxy, the toluenesulfonyl and the nitro groups, and R''' is selected from the groups consisting of hydrogen, the benzyl, the p-nitrobenzyl, the methyl, the ethyl and the tertiary butyl-group.

4. N - carbobenzoxy - L - arginyl - L - prolyl - L-prolyl-glycyl - L - phenylalanyl - L - seryl - L - prolyl - L-phenylalanyl-L-arginin.

5. L - phenylalanyl - L - seryl - L - prolyl - L - phenylalanyl-L-arginin.

6. N-carbobenzoxy-L-arginyl-L-prolyl-L-prolyl-glycin.

7. N - carbobenzoxy - nitro - L - arginyl - L - prolyl - L-prolyl-glycin.

8. L - phenylalanyl - L - seryl - L - prolyl - L - phenylalanyl-nitro-L-arginin-p-nitro-benzylester.

(References on following page)

References Cited by the Examiner

UNITED STATES PATENTS

| | | |
|---|---|---|
| 2,793,204 | 5/1957 | Arens. |
| 2,854,443 | 9/1958 | Boissonnas et al. |
| 3,040,017 | 6/1962 | Schwyzer _____ 260—112.5 |
| 3,131,174 | 4/1964 | Schwyzer _____ 260—112.5 |

OTHER REFERENCES

Fuson: Advances in Protein Chemistry, vol. 5, p. 21–33 and 62–64 (1949).

Konzett: Nature, vol. 188, p. 998 (1960).

Silva et al.: Amer. J. Physiol., vol. 156, pp. 261–273 (1942).

LEWIS GOTTS, *Primary Examiner.*

LEON ZITVER, *Examiner.*

DENNIS P. CLARKE, PERRY STITH,
*Assistant Examiners.*